United States Patent [19]

Adamek

[11] Patent Number: 4,477,091

[45] Date of Patent: Oct. 16, 1984

[54] FIRE RESISTANT CONNECTIONS AND U-LIKE SEALING MEANS THEREFOR

[75] Inventor: Frank C. Adamek, Pasadena, Tex.

[73] Assignee: Gray Tool Company, Houston, Tex.

[21] Appl. No.: 469,356

[22] Filed: Feb. 24, 1983

[51] Int. Cl.³ .............................................. F16J 15/08
[52] U.S. Cl. ...................................... 277/211; 277/22; 277/205; 277/235 A; 277/236
[58] Field of Search ...................... 277/22, 26, 123–125, 277/152, 188 R, 188 A, 192, 193, 199, 205, 206 R, 206 A, 211, 207 R, 235 R, 207 A, 235 B, 236, 227, 228, 208, 198, 165, 167.5

[56] References Cited

U.S. PATENT DOCUMENTS

| 876,977 | 1/1908 | Larsson | 277/235 R X |
| 2,547,185 | 4/1951 | Von Bolhar | 277/206 X |
| 3,285,615 | 11/1966 | Trbovick | 277/206 X |
| 3,561,776 | 2/1971 | Wilson | 277/206 R |
| 4,244,192 | 1/1981 | Chellis | 277/205 X |

FOREIGN PATENT DOCUMENTS

| 698130 | 11/1964 | Canada | 277/236 |
| 249886 | 8/1926 | Italy | 277/206 |
| 545455 | 5/1942 | United Kingdom | 277/206 |
| 712786 | 7/1954 | United Kingdom | 277/236 |
| 724810 | 2/1955 | United Kingdom | 277/205 R |
| 777296 | 11/1980 | U.S.S.R. | 277/236 |

Primary Examiner—Robert S. Ward
Attorney, Agent, or Firm—Arthur E. Fournier, Jr.

[57] ABSTRACT

A fire resistant connection (16) that embodies a U-like sealing means (44) and that is operable for purposes of effectuating the establishment of a fire resistant seal between mating surfaces (56, 58), and in particular mating surfaces (56, 58) of the type that commonly are found to be present in wellhead and valve equipment (10). The subject fire resistant connection (16) includes mating seal surfaces (56, 58) and the aforementioned U-like sealing means (44). The U-like sealing means (44) comprises a U-like seal ring (44), which includes a rib (46) from which a pair of legs (48, 50) depend. Each of the pair of legs (48, 50) terminates in a planar seal lip (52, 54). Each of the seal lips (52, 54) is suitably configured so as to be positionable in sealing engagement with a corresponding one of the mating seal surfaces (56, 58), the latter (56, 58) embodying a configuration that is complementary in nature to that of the seal lips (52, 54) engaged thereby. Likewise, the rib (46) is suitably configured so that it forms an interference fit with the mating seal surfaces (56, 58).

6 Claims, 3 Drawing Figures

FIRE RESISTANT CONNECTIONS AND U-LIKE SEALING MEANS THEREFOR

CROSS REFERENCE TO RELATED APPLICATIONS

This application is hereby cross referenced to the following four patent applications which were commonly filed herewith and which are commonly assigned: U.S. patent application Ser. No. 469,358 filed Feb. 24, 1983 entitled "Fire Resistant Connections And T-Like Sealing Means Therefor", filed in the name of Frank C. Adamek; U.S. patent application Ser. No. 469,357 filed Feb. 24, 1983 entitled "Fire Resistant Connections And Dovetail-Like Sealing Means Therefor", filed in the name of Robert E. Bush; U.S. patent application Ser. No. 469,354 filed Feb. 24, 1983 entitled "Fire Resistant Connections And Double Ribbed Sealing Means Therefor", filed in the name of Robert E. Bush; and U.S. patent application Ser. No. 469,355 filed Feb. 24, 1983 entitled "Fire Resistant Connections Embodying Heat Transfer Means", filed in the names of Charles D. Bridges et al.

BACKGROUND OF THE INVENTION

This invention relates to means for effecting connections between surfaces, and more particularly to means for establishing a fire resistant connection and seal between surfaces of the type that are known to exist in wellhead and valve equipment.

The fact that extreme service conditions are encountered in wellhead applications has long been recognized. Moreover, it has long been known that the nature of such extreme service conditions encompasses, by way of example and not limitation, conditions such as the presence of high and low temperature, sour gas, high fluid velocity, pressure cycling, thermal shock, and/or the existence of forces of vibration, bending, compression, tension or any combination of these forces. In an effort to provide equipment that would be suitable for employment in such wellhead applications, i.e., that would successfully withstand being subjected to extreme service conditions of this type, metal-to-metal seals have heretofore been employed for purposes of effectuating connections and seals in equipment designed to be used in wellhead applications of the aforedescribed type. This selection of metal-to-metal seals for use in this manner has been influenced to some extent by environmental and economic considerations. Moreover, the metal-to-metal seals that have actually been selected for use for this purpose have been of various designs. By way of illustration, reference may be had, among others, to U.S. Pat. No. 2,766,999, which issued on Oct. 16, 1956 to J. D. Watts et al., and/or to U.S. Pat. No. 4,214,763, which issued on July 29, 1980 to R. E. Latham for a showing of a metal-to-metal seal that is disclosed to be suitable for use in equipment, which is designed for employment in wellhead applications.

Although these earlier types of metal-to-metal seals when employed in equipment designed for use in wellhead applications have proven generally to be capable of withstanding the extreme service conditions associated with such applications, i.e., conditions of the sort that have been enumerated hereinbefore, these metal-to-metal seals were never intended to be fire resistant. That is, no requirement existed insofar as the design of these metal-to-metal seals was concerned that they embody the capability of maintaining sealability during periods of thermal expansion and contraction occasioned by the occurrence of wellhead fires. It is only more recently that the matter of fire resistance has come to be viewed as a consideration in the design of connections and seals of the type found in equipment that is intended for use in wellhead applications. Moreover, to some in the industry this matter of fire resistance has gone beyond the state of being simply a consideration, but rather has now risen to the level of being a requirement that future designs of metal-to-metal seals must satisfy.

For purposes of exemplifying what constitutes fire resistant wellhead equipment as this term is being employed herein, reference can be had at least insofar as 5,000 psig and 10,000 psig working pressure equipment is concerned to the statement of requirements that is embodied in American Petroleum Institute's RP6F "Modified". As set forth therein, 5,000 psig working pressure equipment must satisfy the following test criteria; flame temperature one inch from the wall—1100° C. (2000° F.); stabilization temperature within 3½ hours—650° C. (1200° F.); high test pressure throughout the charging test—3750 psi; low test pressure throughout the test—500 psi; test media—water; hold period at stabilization temperature—one hour; valve backseat test pressure for oil service—100 psi; valve backseat test pressure for gas service—500 psi; allowable leakage—zero external leakage; and functional valve test after burn—replace stem assembly, open one time, zero external leakage allowed. With respect to 10,000 psig working pressure equipment, the test criteria that must be satisfied are as follows: flame temperature one inch from the wall—1100° C. (2000° F.); stabilization temperature within 3½ hours—650° C. (1200° F.); high test pressure throughout the test—7500 psi; low test pressure throughout the test—500 psi; charging test media—water; hold period at stabilization temperature—one hour; valve backseat test pressure for oil service—100 psi; valve backseat test pressure for gas service—500 psi; allowable leakage—zero external leakage; and functional valve test after burn—replace stem assembly, open one time, zero external leakage allowed.

The high temperatures which are encountered during wellhead fires give rise to a variety of problems. Included among these are problems that can be linked to the rapid thermal heatup and cooldown of the material which is exposed to the wellhead fire, the expansion and/or contraction of the exposed material, and/or a loss in the properties which the exposed material exhibits. For ease of classification, however, the aforereferenced problems fall basically into two categories. Namely, there are those problems which relate to the structural characteristics exhibited by the wellhead equipment material upon being exposed to a wellhead fire, and there are those problems that relate to the capability of connections and seals in wellhead equipment to maintain their sealability when the wellhead equipment is subjected to a wellhead fire.

Addressing first the matter of the structural characteristics of wellhead equipment material, for purposes of rendering such material fire resistant, i.e., capable of satisfying the test criteria enumerated above for 5000 psig and 10,000 psig working pressure equipment, the loss of tensile strength exhibited thereby when exposed to a wellhead fire can be compensated for in several ways. First, advantage can be taken of the fact that API's RP6F "Modified" permits a twenty-five percent downrating to be had in the pressure limits which 5000 psig working pressure equipment must be capable of withstanding. Secondly, the pressure vessel walls of the equipment in question can be oversized. Accordingly, it has been found that this twenty-five percent downrating permitted by API's RP6F "Modified" coupled with the oversizing of the pressure vessel walls of the wellhead equipment is sufficient to compensate for the loss of the tensile strength that occurs when the wellhead equipment is exposed to elevated temperatures.

Although wellhead housings and valve housings become large when the walls thereof are oversized, i.e., when API type materials are employed therefor, such housings nevertheless remain within practical limits. Therefore, there is no necessity to make use of exotic steels, etc. for this type of equipment. This is not to say, though, that future developments in the area of materials research may not produce new cost effective, high strength alloys, which will enable a reduction to be had in the sizing of wellheads and valves of the type that fall within the category of 5000 psig working pressure equipment.

Turning now to the matter of the sealability of the connections and seals that are embodied in wellhead equipment, it is essential for the reasons that have been discussed previously herein that such connections and seals be effectuated through the use of metal-to-metal seals. On the other hand, however, if such metal-to-metal seals are to be capable of exhibiting adequate tensile strength at elevated temperatures the view has been taken that there must be utilized therein high strength materials as overlays or seal ring materials. Elastomers, as they are known today, are known to perform unsatisfactorily when employed under the sort of conditions to which wellhead equipment is subjected when a wellhead fire occurs. The one nonmetallic material which may have some merit for use in such applications is that which is referred to by those in this industry as "graphoil".

By and large, therefore, it can thus be seen that in order to develop wellhead and valve equipment that is fire resistant, i.e., satisfies insofar as the principal requirements for fire resistance are concerned the statement of requirements that is embodied in API's RP6F "Modified", a need has existed to develop improved sealing techniques that would be suitable for use to effect seals that would maintain their sealability at elevated temperatures. More specifically, there has existed a need to develop improved high temperature sealing techniques that would be applicable for use in connection with both the tubular and annular seals that are to be found in wellhead equipment, and which would enable the latter equipment to withstand in terms of sealability the range of temperatures to which such equipment would commonly be exposed in the course of a wellhead fire. In this context, in order to develop such an improved high temperature sealing technique there would exist a need to address the following areas: the thermal and metallurgical characteristics of the materials involved, the relative movement that occurs between the mating parts, and the sliding action that the seal must endure.

Attempts at the development of such high temperature sealing techniques have been undertaken. Further, the focus thereof at the outset was predicated on the following notions. Foremost was the notion that a clamp connection because of its mass would prove to be beneficial insofar as a fire resistant connection is concerned. Moreover, it was felt that such a clamp connection would probably prove to be the only suitable connection for use in wellhead and valve equipment that was designed to be fire resistant. Accordingly, considerable time and effort was devoted to the development of a suitable clamp connection that would maintain its sealability at elevated temperatures. However, not only did the mass of a large enhanced clamp prove to be detrimental to heat exchange properties of the wellhead and valve equipment per se, but indeed proved to be uncontrollable in terms of torsional deflection and permanent set. In turn, the latter prevented retention of any seal that was dependent upon the clamp connection as a holding device.

As a result of the realization of the above, the development of a studded clamp connection was undertaken. However, the unfavorable heat transfer properties of the added mass of the large clamp soon led to the abandonment of the clamp itself. This was done principally so that a more favorable heat transfer could be realized in a less irregular surface surrounding the wellhead housing. It was then concluded that in the context of attempting to render wellhead and valve equipment fire resistant large clamp connections should not be utilized.

Enhanced flange connections have since been developed which are capable of maintaining the required seal contact force and connection stability. Furthermore, it is practical to prepare such an enhanced flange connection with a hub profile that may be utilized during the drilling operation. Notwithstanding this though it is still strongly recommended that large clamps not be utilized in wellhead and valve equipment that is intended to be designated as being fire resistant.

Thus, to summarize, it has been concluded from analytical and test results that API type materials are suitable for use in forming pressure containing members of wellhead housings, valve bodies, and bonnets. Further, it is viewed as being practical to construct valve bodies and wellhead housings of such materials. That is, the use of such materials for this purpose does not lead to enormous enlargement of the equipment to the point of being impractical. On the other hand, however, it must be recognized that API type materials are not suitable for use in performing a sealing function. Accordingly, it is essential that within any wellhead and valve equipment housings that overlays and seal rings of high strength materials be inserted. Furthermore, these overlays and seal rings of high strength material must be of sufficient size and integrity to withstand the loading forces necessary to effect the sealing function. In addition, the materials utilized in this connection in the overlays and in the seal rings must of necessity be selected for compatibility, for their elevated temperature strength, and of great importance, their thermal conductivity. Namely, it is very important that the material selected for use in these sealing areas be compatible from the standpoint of thermal expansion and contraction, corrositivity, weldability and gall resistance. However, even when the above criteria have been satisfied, there still remains a need to provide a high temperature seal, which in terms of its design as contrasted to the matter of the materials from which it is formed, is suitable for use in wellhead and valve equipment that may be subjected to elevated temperatures of the type that are experienced during the course of a wellhead fire. That is, a need has been evidenced for a seal design wherein a seal constructed in accordance therewith would when employed in wellhead and valve equipment be characterized by the fact that it possessed the capability of maintaining its sealability even when the wellhead and valve equipment in which it was embodied was involved in a wellhead fire.

In particular, a need has been evidenced for a seal embodying a design which would render the latter especially suitable for use as an annular seal. More specifically, it is desired to provide a seal which would embody such a design and which would be suitable for use as an annular seal in order to effectuate, for example, a seal between a mandrel hanger and a wellhead housing.

It is, therefore, an object of the present invention to provide a new and improved connection, i.e., a seal, suitable for employment in wellhead and valve equipment.

It is another object of the present invention to provide such a connection, i.e., a seal, which when employed in wellhead and valve equipment is capable of withstanding the conditions imposed thereupon during the occurrence of a wellhead fire.

It is still another object of the present invention to provide such a connection, i.e., a seal, which is characterized in that it exhibits adequate tensile strength even at the elevated temperatures that exist when a wellhead fire occurs.

A further object of the present invention is to provide such a connection, i.e., a seal, which is characterized in that it exhibits the capability of being able to maintain its sealability even at the elevated temperatures that exist when a wellhead fire occurs.

A still further object of the present invention is to provide sealing means of unique design which is particularly suited for use in a connection, i.e., a seal, of the sort that is intended for employment in wellhead and valve equipment of the type that is designed to be denoted as being fire resistant.

Yet another object of the present invention is to provide sealing means in the form of a U-shaped seal ring which when employed as a component of a connection, i.e., a seal, in wellhead and valve equipment is operative to enable the connection, i.e., the seal, to maintain its sealability when the equipment in which the connection, i.e., the seal, is embodied is subjected to the conditions that are associated with the occurrence of a wellhead fire.

Yet still another object of the present invention is to provide such a connection, i.e., a seal, embodying such a U-shaped seal ring which is relatively inexpensive to provide and easy to employ, while yet being capable of providing reliable and effective service even when exposed to the conditions that exist when a wellhead fire occurs.

SUMMARY OF THE INVENTION

In accordance with the present invention there is provided a new and improved fire resistant connection, i.e., seal, that embodies a U-like sealing means and which is operative for purposes of effectuating the establishment of a fire resistant connection and seal between mating surfaces, particularly mating surfaces of the type that are commonly encountered in wellhead and valve equipment. The subject connection, i.e., seal, encompasses mating sealing surfaces such as, for example, the inner surface of a wellhead housing and the external surface, i.e., wall of a hanger mandrel, and the aforereferenced U-like sealing means. The latter U-like sealing means comprises a U-shaped seal ring that consists of a heavy structural rib from which a pair of seal lips depend in spaced relation one to another. When the subject connection, i.e., seal, is in its assembled, i.e., sealing, condition, the rib of the seal ring is suitably positioned within the space that exists between the wellhead housing and the wall of the hanger mandrel such that a slight interference fit prevails between the rib and the wellhead housing and the hanger mandrel. Further, the seal lips extend downwardly between the wellhead housing and the hanger mandrel such as to form mating seal surfaces with the latter, i.e., the straight sided surfaces of the wellhead housing and the hanger mandrel. The stiffening of the rib enables the seal lips to function independently when loaded by virtue of the interference fit that exists between the seal lips and the mating sealing surfaces of the wellhead housing and the wall of the hanger mandrel. Preferably, the mating seal surfaces of the mandrel and the wellhead housing are prepared with hard surfacing to prevent galling. Similarly, anti-galling compounds are preferably utilized on appropriate portions of the U-shaped seal ring in order to allow freedom of movement without galling of the seal lips during thermally active cycles, e.g., when a wellhead fire occurs.

DESCRIPTION OF A PREFERRED EMBODIMENT

Figure 1:
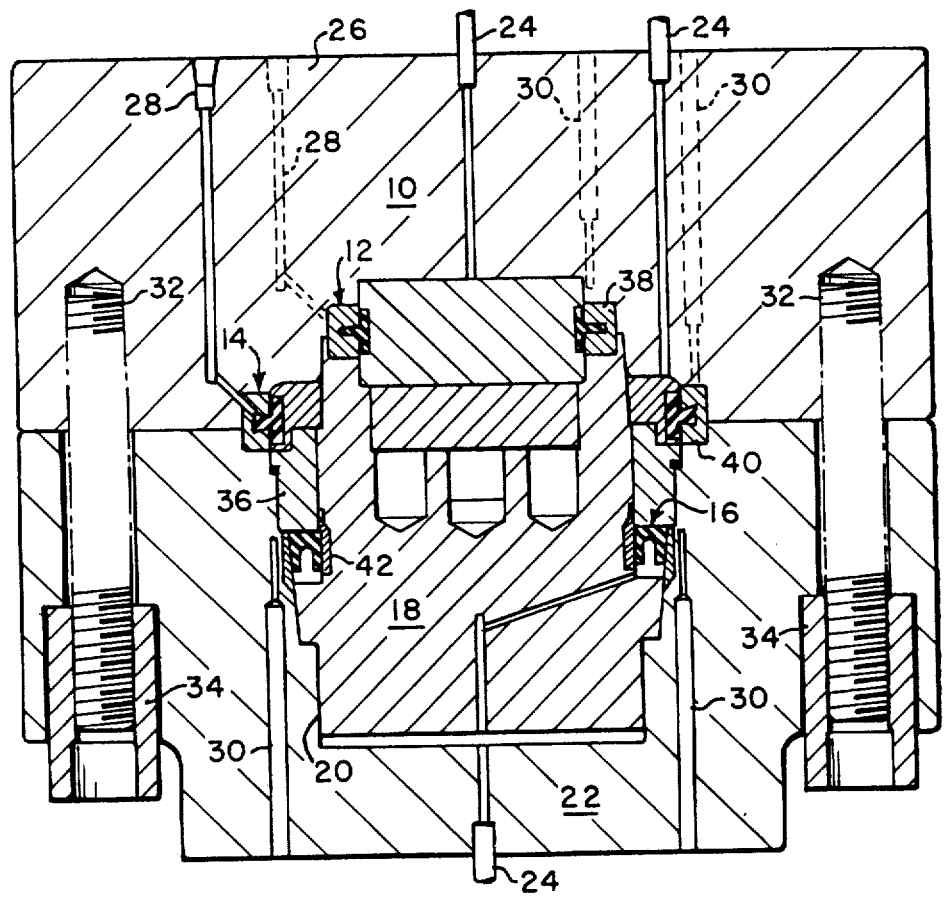
FIG. 1 is a schematic representation of a test fixture depicting emplaced therewithin in its operative, i.e., sealing, state a fire resistant connection, i.e., seal, constructed in accordance with the present invention.

Referring now to the drawing, and more particularly to FIG. 1 thereof, there is to be found depicted therein a test fixture, generally designated by the reference numeral 10. The test fixture 10 is operative for purposes of testing under simulated conditions the various components of a wellhead assembly that would be utilized during the course of a drilling and completion operation for oil and/or gas. Moreover, the test fixture 10 is designed to be operative for purposes of qualifying the connections and seals that are utilized in wellhead and valve equipment as being fire resistant, i.e., as satisfying the statement of requirements that have been promulgated by the American Petroleum Institute in API RP6F "Modified".

The test fixture 10 when constructed as shown in FIG. 1 is capable of being employed to simultaneously effect the testing of three connections, i.e., seals, the latter being denoted generally in FIG. 1 by the reference numerals 12, 14 and 16. To this end, the test fixture 10 can be utilized for purposes of simulating a tubing head component test. The objective in such a test is to utilize the test fixture 10 for purposes of checking out the following components: a studded flange assembly with the connection, i.e., seal, 14 being cooperatively associated therewith; a tubing hanger with the connection, i.e., seal, 12 being cooperatively associated therewith; and a tubing hanger with the connection, i.e., seal, 16 being cooperatively associated therewith.

The tubing hanger assembly used in the test fixture 10, must, of necessity, be capable of simulating the conditions that would occur when tubing weight and holddown screws combine to lock a tubing hanger into position. Accordingly, for purposes of the test fixture 10, a tubing hanger is depicted at 18 in FIG. 1. The tubing hanger 18 is provided with a threaded connection at the bottom thereof seen at 20 in FIG. 1. This threaded connection 20 is designed to function as a substitute for the condition described above wherein the tubing weight and holddown screws combine to lock a tubing hanger into position. In addition, the threaded connection 20 serves to stabilize the tubing hanger section 18 within the tubing head housing identified in FIG. 1 by the reference numeral 22.

With further reference to FIG. 1, as depicted therein the center of the mandrel tubing hanger 18 is also the means of porting for one, or more, of the several monitoring/pressure or thermal observation ports necessary in the test asembly, i.e., fixture 10. By way of exemplification in this regard, pressure ports are denoted by the reference numeral 24 in FIG. 1. The upper flange 26 of the test assembly 10 is intended to simulate the bottom of a block valve assembly, which would normally be prepared as the tubing bonnet. As such, from the annular seal cavity on, the test fixture 10 is a true representation of an actual tubing wellhead assembly.

In accordance with the test criteria of API RP6F "Modified", pressure is held on all of the seals 12, 14 and 16 that are emplaced within test fixture 10 when the test cycle is being conducted thereon. For purposes of applying pressure to the seals 12, 14 and 16 and ensuring that the latter pressure is held throughout the test cycle, the aforereferenced pressure ports 24 are suitably located within the test fixture 10. Leakage, should it occur is monitored through ports, such as those identified by the reference numeral 28 in FIG. 1. To this end, as seen with reference to FIG. 1 the monitoring ports are suitably placed in the test fixture 10 so as to be located adjacent to each of the seal areas 12, 14 and 16. Thermally, the behavior of the seals 12, 14 and 16 in the test fixture 10 is monitored by placing thermocouples, such as those identified by the reference numeral 30 in FIG. 1, adjacent to each of the seals 12, 14 and 16. Preferably, all pressure and thermal measurements are recorded on strip chart recorders during the entire duration of the test cycle. Further, the volumetric leakage from any monitored area is preferably also collected and recorded.

With further reference to FIG. 1, studs 32 and nuts 34 retain the housing bonnet, i.e., flange, 26 of the test fixture 10 in contact with the connection, i.e., seal, 14. In addition, the same studs 32 and nuts 34 provide the restraining force for the connection, i.e., seal, 12 at the top of the seal area of the tubing hanger 18. Accordingly, any thermally active growth occurring in the wall of the housing 26 adjacent to either of the seals 12 and 14 must be accommodated by one or both of these two seals 12 and 14. Similarly, the seal 16 interacts to the movement of the tubing hanger mandrel 18. It should also be noted here that the seal 16 also interacts with the tubing hanger seal 12 located thereabove. Thus, it can be seen that the interaction resulting from thermal activity can and does occur between all three of the seal areas 12, 14 and 16. This interaction is a principal design concern in the development of wellhead and valve equipment that is intended to be fire resistant, i.e., be capable of satisfying the requirements set forth in API RP6F "Modified". Furthermore, this interaction becomes of even greater concern when a primary flanged seal is to be inserted into the system as has been done, for example, in the case of the test fixture 10.

Completing the description of the test fixture 10 as shown in FIG. 1, a retaining ring 36 is interposed between the tubing hanger 18 and the modified flange 22. Also, hardfaced seal surfaces overlays are cooperatively associated respectively with each of the seals 12, 14 and 16. In accord with the best mode embodiment of the test fixture 10, the material from which the tubing hanger 18, the flange 26 and nuts 34 are each formed is, as an example, preferably AISI-4140. Further, the hardseal surfaces overlays 38, 40 and 42 are, as an example, preferably each formed from Inconel 625, the latter being a trademark of International Nickel. Lastly, the material from which the studs 32 are formed is, as an example, preferably Inconel X-750, the latter being a trademark of International Nickel.

A description will now be had in more detail of the connection, i.e., seal, which is denoted by the reference numeral 16 in FIG. 1, and which forms the subject matter of the present invention. For this purpose, reference will be had to each of FIGS. 1, 2 and 3 of the drawing. As best understood with reference to FIGS. 1 and 2, the connection, i.e., seal, 16 encompasses a pair of mating seal surfaces, the latter constituting the tubing hanger 18 and the tubing head housing, i.e., modified flange, 22 in the case of the structure which is illustrated in FIG. 1, and a U-shaped sealing means, the latter being identified by the reference numeral 44 in FIG. 2.

Figure 3:
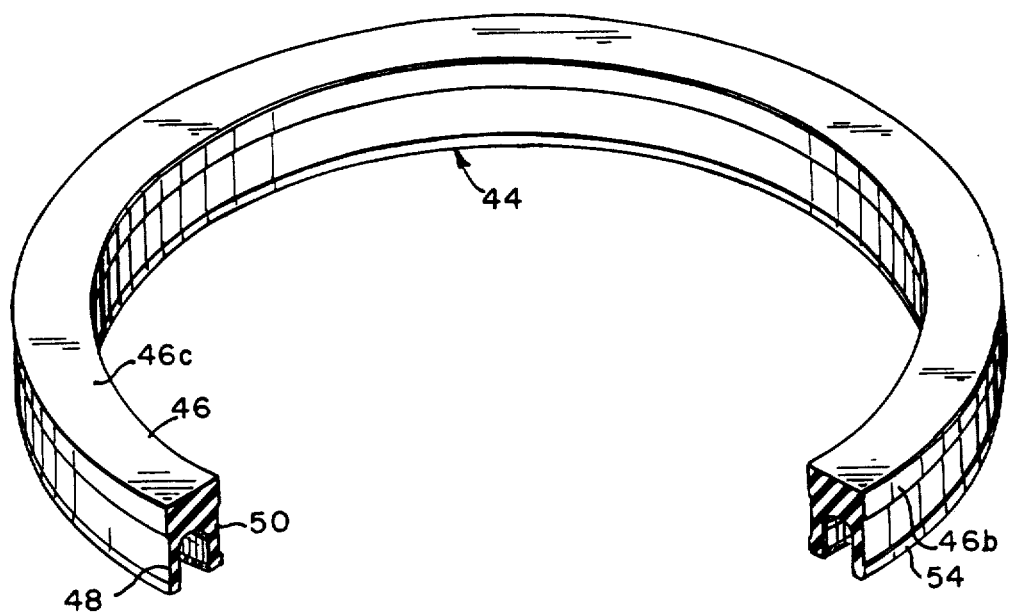
FIG. 3 is a perspective view on an enlarged scale and with a portion cutaway of the seal ring of a fire resistant connection, i.e., seal, constructed in accordance with the present invention.

The U-like sealing means 44, as best understood with reference to FIG. 3 of the drawing, takes the form of a U-shaped seal ring. To this end, the U-shaped seal ring 44 as shown in FIG. 3 is substantially cylindrical in nature. Further, the U-shaped seal ring 44 includes a heavy structural rib 46 and a pair of legs 48 and 50 that depend therefrom and which each terminate in a seal lip 52 and 54, respectively. The latter seal lips 52 and 54 are suitably formed on the external surfaces of the depending legs 48 and 50, respectively. Further, note is made of the fact that as depicted in both FIGS. 2 and 3 of the drawing, the rib 46 is slightly enlarged, i.e., includes the portions identified by the reference numerals 46a and 46b in FIG. 2, on each side of the planar portion 46c thereof for a purpose yet to be described. In accord with the best mode embodiment of the invention, the enlarged portions 46a and 46b of the rib 46 are each suitably dimensioned so as to be substantially identical one to another in terms of size. Likewise, each of the seal lips 52 and 54 is suitably dimensioned so as to be substantially identical one to another in terms of size.

Figure 2:
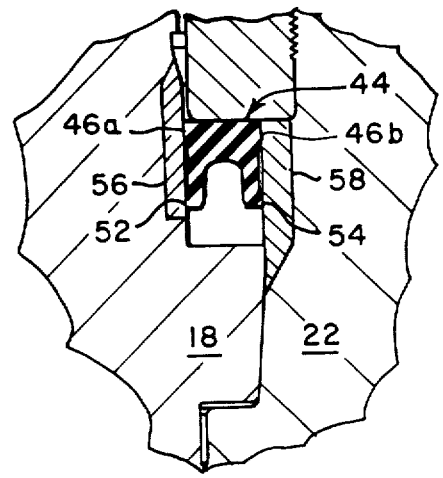
FIG. 2 is a cross-sectional view with parts broken away of a portion of a fire resistant connection, i.e., seal, constructed in accordance with the present invention.

Continuing with the description of the U-shaped seal ring 44, it can be seen from both FIGS. 2 and 3 of the drawing that the planar portion 46c of the rib 46 is operative to define a first plane. Furthermore, it can be seen from FIGS. 2 and 3 that the seal lips 52 and 54 each embody a planar surface. Also, as shown in FIGS. 2 and 3 the seal lips 52 and 54 lie in planes that are parallel one to another as well as being perpendicular to the plane that the planar portion 46c of the rib 46 defines.

With further reference in particular to FIG. 2 of the drawing, when the connection, i.e., seal, 16 occupies its sealing position, the seal lips 52 and 54 contact mating sealing surfaces, denoted by the reference numerals 56 and 58, respectively, in FIG. 2, which like the seal lips 52 and 54 themselves are substantially planar in nature as well as being substantially cylindrical. That is, the mating sealing surfaces 56 and 58 which the planar seal lips 52 and 54, respectively, are designed to contact each embody a configuration which is complementary in nature to the configuration of the planar seal lips 52 and 54. Further, with the connection, i.e., seal, 16 in the sealing position, mechanical loading of the seal 16 is provided by the existence of an interference fit between the enlarged portions 46a and 46b of the rib 46 and the mating sealing surfaces 52 and 54 which the portions 46a and 46b, respectively, are designed to contact. As such, the seal lips 52 and 54 perform a sealing function.

Continuing, the large mass of the rib 46, i.e., the height times the width thereof as compared to that of seal lips 52 and 54 enables two essential functions to be performed by the rib 46. Namely, the rib 46 functions to stabilize the seal lips 52 and 54 such that the latter may function separately, i.e., independent of each other, as the need therefor may arise when the mating sealing surfaces that are in contact therewith are subjected to thermal distortion. Secondly, the large mass of the rib 46 enables the latter to function to provide effective heat transfer to the seal area. To this end, the rib 46 may be plated with a suitable material having a high heat transfer coefficient in order to enhance the direct transfer of heat from the rib section into the heavy rib area.

The mating sealing surfaces 56 and 58 preferably are prepared with hard surfacing to prevent galling. Likewise, anti-galling compounds are utilized preferably on the seal ring 44 to allow freedom of movement of the seal lips 52 and 54 during a thermally active cycle without the galling thereof. In this regard, any malleable coating material which possesses good heat transfer properties as well as high gall resistance at 1200° F. is suitable for use for this purpose, such as silver.

In summary, it has been found that a connection, i.e., seal, constructed in the manner of the seal 16 will maintain its sealability at elevated temperatures of the type encountered during the occurrence of a wellhead fire notwithstanding the fact that the members which the seal 16 serves to connect may undergo axial movement. This is in contrast to prior art forms of metal-to-metal seals wherein due to the angular inclination of the surfaces thereof, relative axial movement tends to cause the mating sealing surfaces to separate and thereby renders the sealing action of the metal-to-metal seal ineffective.

Radial movement of the members which the connection, i.e., seal, 16 serves to connect is not a problem because of the fact that the coefficients of expansion of the material from which these members are formed are chosen so as to be very similar. Accordingly, the amount of radial movement that occurs is so slight as to be insufficient to overcome the spring forces being exerted by the seal lips 52 and 54 of the seal 16 against the mating sealing surfaces.

Thus, in accordance with the present invention there has been provided a new and improved form of connection, i.e., seal, that is suitable for employment in wellhead and valve equipment. Moreover, the subject connection, i.e., seal, of the present invention when employed in wellhead and valve equipment is capable of withstanding the conditions imposed thereupon during the occurrence of a wellhead fire. In addition, in accord with the present invention a connection, i.e., seal, is provided which is characterized in that it exhibits adequate tensile strength even at the elevated temperatures that exist when a wellhead fire occurs. Further, the connection, i.e., seal, of the present invention is characterized in that it exhibits the capability of being able to maintain its sealability even at the elevated temperatures that exist when a wellhead fire occurs. Additionally, in accordance with the present invention a sealing means of unique design is provided which is particularly suited for use in a connection, i.e., seal, of the sort that is intended for employment in wellhead and valve equipment of the type that is designed to be denoted as being fire resistant. Also, the sealing means of the present invention takes the form of a U-shaped seal ring which when employed as a component of a connection, i.e., a seal, in wellhead and valve equipment is operative to enable the connection, i.e., the seal, to maintain its sealability when the equipment in which the connection, i.e., the seal, is embodied is subjected to the conditions that are associated with the occurrence of a wellhead fire. Furthermore, in accord with the present invention a connection, i.e., seal, embodying such a U-shaped seal ring is provided which is relatively inexpensive to provide and easy to employ, while yet being capable of providing reliable and effective service even when exposed to the conditions that exist when a wellhead fire occurs.

While only one embodiment of my invention has been shown, it will be appreciated that modifications thereof, some of which have been alluded to hereinabove, may still be readily made thereto by those skilled in the art. I, therefore, intend by the appended claims to cover the modifications alluded to herein as well as all other modifications, which fall within the true spirit and scope of my invention.

What is claimed is:

1. A connection for effectuating the establishment of a fire resistant connection and seal between mating sealing surfaces comprising:
   (a) a continuous seal ring including a rib formed thereon having a first end and a second end, said rib lying in a plane, said rib having a first enlarged portion formed at said first end thereof so as to project outwardly to a slight extent therefrom, said rib further having a second enlarged portion formed at said second end thereof so as to project outwardly to a slight extent therefrom, said continuous seal ring further including a first leg depending from said first end of said rib and a second leg depending from said second end of said rib, said first leg lying in a plane extending perpendicular to said plane of said rib, said second leg lying in a plane extending parallel to said plane of said first leg and perpendicular to said plane of said rib, said first leg having a seal lip formed adjacent to the free end thereof so as to project outwardly therefrom to a slight extent on the external surface thereof, said seal lip of said first leg terminating in a planar sealing surface, said second leg having a seal lip formed adjacent to the free end thereof so as to project outwardly therefrom to a slight extent on the external surface thereof, said seal lip of said second leg terminating in a planar sealing surface;
   (b) a first mating sealing surface having a first portion embodying a configuration complementary to the configurartion of said planar sealing surface of said seal lip of said first leg, said first mating sealing surface further having a second portion embodying a configuration complementary to the configuration of said first enlarged portion formed at said first end of said rib;

(c) a second mating sealing surface having a first portion embodying a configuration complementary to the configuration of said planar sealing surface of said seal lip of said second leg, said second mating sealing surface further having a second portion embodying a configuration complementary to the configuration of said second enlarged portion formed at said second end of said rib; and (d) said continuous seal ring when positioned relative to said first and second mating sealing surfaces for purposes of effectuating the establishment of a fire resistant connection and seal therewith having said planar sealing surface of said seal lip of said first leg positioned in sealing engagement with said first portion of said first mating sealing surface, said planar sealing surface of said seal lip of said second leg positioned in sealing engagement with said first portion of said second mating sealing surface, said first enlarged portion of said rib engaging said second portion of said first mating sealing surface, said second enlarged portion of said rib engaging said second portion of said second mating sealing surfaces.

2. The connection as set forth in claim 1, wherein said planar sealing surface of said seal lip of said first leg and said planar sealing surface of said seal lip of said second leg are each coated with anti-galling material.

3. A continuous seal ring for use in effecting a fire resistant connection between mating seal surfaces comprising: a member including a rib formed thereon having a first end and a second end, said rib lying in a plane, said rib having a first enlarged portion formed at said first end thereof so as to project outwardly to a slight extent therefrom, said rib further having a second enlarged portion formed at said second end thereof so as to project outwardly to a slight extent therefrom, said member further including a first leg depending from said first end of said rib and a second leg depending from said second end of said rib, said first leg lying in a plane extending perpendicular to said plane of said rib, said second leg lying in a plane extending parallel to said plane of said first leg and perpendicular to said plane of said rib, said first leg having a seal lip formed adjacent to the free end thereof so as to project outwardly therefrom to a slight extent on the external surface thereof, said seal lip of said first leg terminating in a planar sealing surface, said second leg having a seal lip formed adjacent to the free end thereof so as to project outwardly therefrom to a slight extent on the external surface thereof, said seal lip of said second leg terminating in a planar sealing surface such that when employed to effect a fire resistant connection between mating sealing surfaces said planar sealing surface of said seal lip of said first leg is positioned in sealing engagement with one of the mating sealing surfaces, said planar sealing surface of said seal lip of said second leg is positioned in sealing engagement with the other of the mating seal surfaces, said first enlarged portion of said rib engages one of the mating sealing surfaces and said second enlarged portion of said rib engages the other of the mating sealing surfaces.

4. The continuous seal ring as set forth in claim 3 wherein said planar sealing surface of said seal lip of said first leg and said planar sealing surface of said seal lip of said second leg are each coated with anti-galling material.

5. In wellhead equipment including first and second members, the improvement comprising first resistant connection means operative for connecting together the first and second members, said fire resistant connection means comprising:

(a) a continuous seal ring including a rib formed thereon having a first end and a second end, said rib lying in a plane, said rib having a first enlarged portion formed at said first end thereof so as to project outwardly to a slight extent therefrom, said rib further having a second enlarged portion formed at said second end thereof so as to project outwardly to a slight extent therefrom, said continuous seal ring further including a first leg depending from said first end of said rib and a second leg depending from said second end of said rib, said first leg lying in a plane extending perpendicular to said plane of said rib, said second leg lying in a plane extending parallel to said plane of said first leg and perpendicular to said plane of said rib, said first leg having a seal lip formed adjacent to the free end thereof so as to project outwardly therefrom to a slight extent on the external surface thereof, said seal lip of said first leg terminating in a planar sealing surface, said second leg having a seal lip formed adjacent to the free end thereof so as to project outwardly therefrom to a slight extent on the external surface thereof, said seal lip of said second leg terminating in a planar sealing surface;

(b) a first portion formed in the first member having a configuration complementary to the configuration of said planar sealing surface of said seal lip of said first leg and a second portion formed in the first member having a configuration complementary to the configuration of said first enlarged portion formed at said first end of said rib;

(c) a first portion formed in the second member having a configuration complementary to the configuration of said planar sealing surface of said seal lip of said second leg and a second portion formed in the second member having a configuration complementary to the configuration of said second enlarged portion formed at said second end of said rib; and (d) said continuous seal ring when positioned relative to the first and second members for purposes of effectuating the establishment of a fire resistant connection therewith having said planar sealing surface of said seal lip of said first leg positioned in sealing engagement with said first portion of the first member, said planar sealing surface of said seal lip of said second leg positioned in sealing engagement with said first portion of the second member, said first enlarged portion of said rib engaging said second portion of the first member, said second enlarged portion of said rib engaging said second portion of the second member.

6. In wellhead equipment the improvement of fire resistant connection means as set forth in claim 5 wherein said planar sealing surface of said seal lip of said first leg and said planar sealing surface of said seal lip of said second leg are each coated with anti-galling material.

* * * * *